J. H. THORNBURG.
HOG FEEDER.
APPLICATION FILED MAY 10, 1911.
1,031,397.
Patented July 2, 1912.
2 SHEETS—SHEET 1.
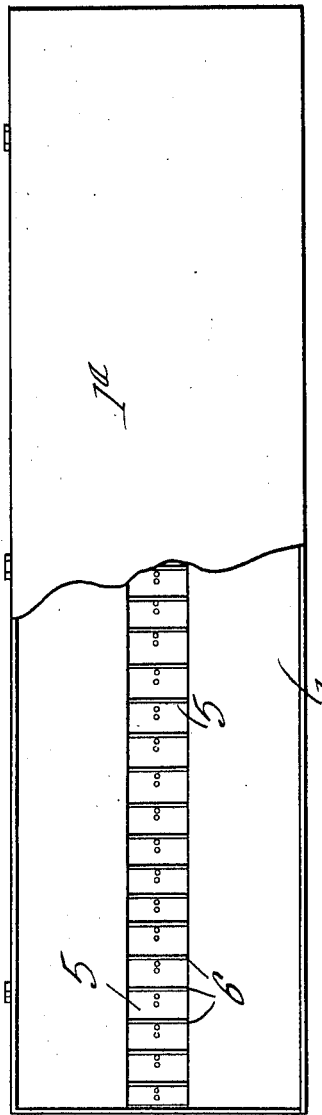
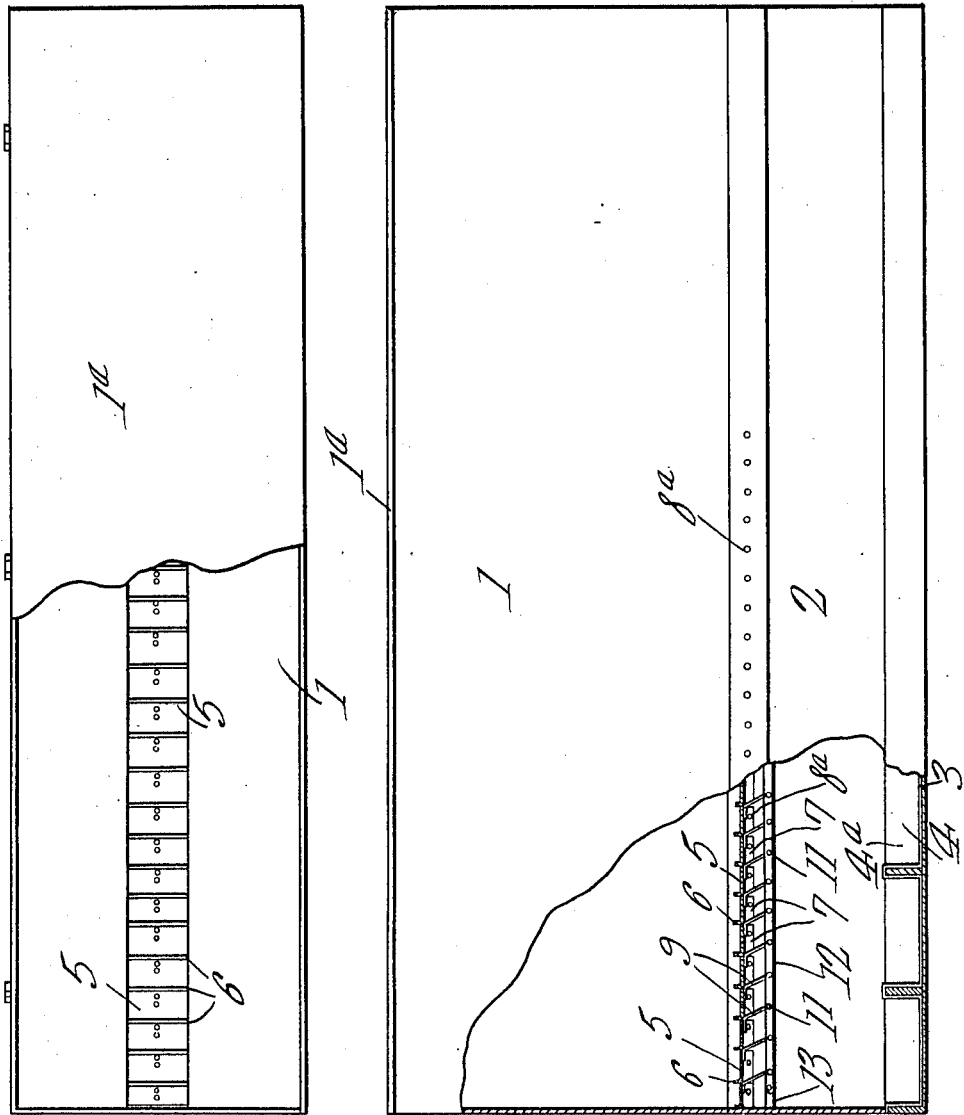
John H. Thornburg,
Inventor
Witnesses
by C. A. Snow & Co.,
Attorneys J. H. THORNBURG.
HOG FEEDER.
APPLICATION FILED MAY 10, 1911.
1,031,397.
Patented July 2, 1912.
2 SHEETS—SHEET 2.
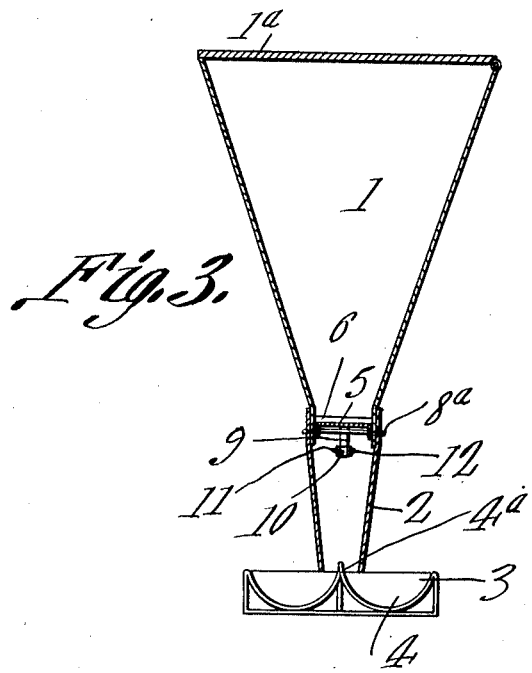
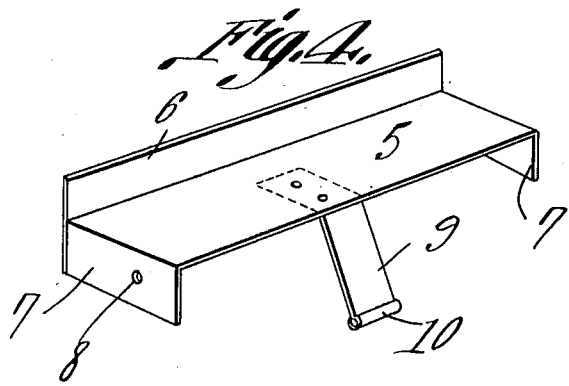
John H. Thornburg,
Inventor

UNITED STATES PATENT OFFICE.

JOHN H. THORNBURG, OF KNIGHTSTOWN, INDIANA.

HOG-FEEDER.

1,031,397.  Specification of Letters Patent.  Patented July 2, 1912.

Application filed May 10, 1911.  Serial No. 626,328.

*To all whom it may concern:*

Be it known that I, JOHN H. THORNBURG, a citizen of the United States, residing at Knightstown, in the county of Henry and State of Indiana, have invented a new and useful Hog-Feeder, of which the following is a specification.

This invention relates to improvements in contrivances or means for feeding small animals especially hogs.

The invention has for its object to effect feeding or supplying to the respective feeding compartments particularly dry food or feed, as bran, "shorts," shelled corn, etc., as well as any kind of ground food or feed.

A further object of the invention is to simplify, facilitate and expedite the feeding operation and to effect said feeding operation in such manner that the hogs or animals, any desired number thereof, may all be supplied at one operation.

A still further object is to provide for feeding the animals separately and to effect this in an equable manner.

A still further object of the invention is to carry out the aforesaid ends in a simple, expeditious and effective way.

The invention consists of certain instrumentalities and features substantially as hereinafter fully disclosed and defined by the claims.

In the accompanying drawings illustrating the preferred embodiment of my invention wherein it will be understood that various changes and modifications may be made therein as relates to the details of the construction and arrangement of the parts without departing from the spirit of the invention.

Figure 1 is a plan view, partly broken, of my feeding device. Fig. 2 is a general side elevation, partly broken and partly in section, of the same. Fig. 3 is a sectional elevation thereof, the line of section passing through any two opposed feeding troughs. Fig. 4 is an enlarged detailed perspective view of a tilting or pivoted bottom section or member of the feed containing hopper.

In practising my invention, I suitably provide a hopper or receptacle 1 having a suitable closure or cover 1ª, for containing the feed or food material, such, preferably, as above named, said hopper having a transversely contracted downward-extension or chute 2, commensurate in length with that of the hopper.

Arranged at the lower end of, and adapted to receive the material, in practise, delivered or fed through the chute 2, is a trough 3, preferably sub-divided into transverse compartments 4 upon the opposite sides of a central partition 4ª subdividing the trough longitudinally, for the accommodation or feeding of the animals or hogs separately, the bottoms of these compartments being preferably, in this instance, concaved or arcuate for obvious reasons.

The bottom of the hopper or receptacle 1 is constructed preferably of a plurality of, or numerous sections or members 5, arranged to form, practically a continuous structure or horizontal partition, for suitably upholding the superposed feed or material within the hopper. These bottom or partition-forming members or sections 5 are preferably, each, of general rectangular plate-like outline, especially as disclosed by Fig. 4, a longitudinal edge thereof having a vertical upstanding portion 6 to primarily sub-divide the superposed feed or material and to form a guard at that point for preventing the material received thereon, encroaching or casually overflowing upon the adjacent or contiguous bottom member or section, as will be readily appreciated. The ends of each bottom member or section have depending therefrom extensions or transverse flanges 7 to receive, through openings or apertures 8 therein at one side of, or eccentrically to the longitudinal center of the member or section, a pivoting rod or member therefor 8ª, received and supported at its ends in apertures in the lateral portions of the leg or chute 2, at its upper end, in order to allow of suitably tilting said member or section, for thus delivering or dumping the portion of the feed carried thereby, into the trough, or rather its compartment, therebelow, as will be readily appreciated. The opposite or other longitudinal edge of the bottom section or member has dependent about centrally therefrom, a laterally and downwardly inclined or deflected inflexible arm or link 9, said arm or link having preferably, a lower end eye or loop ended terminal 10 to receive a bolt or pin 11, suitably effecting connection therebetween and parallel preferably plate-like members or strips 12, and whereby the entire plurality of bottom members or sections may be all connected for simultaneous action.

The plate members or strips 12 are suitably connected preferably by links 13, to a manually actuated lever 14, suitably pivoted at its lower end, preferably as disclosed by Fig. 2 or otherwise, at one end of the leg or chute 2 of the hopper. In order to deliver or feed the superposed material from the hopper, into the respective feeding compartments of the trough 3 for suitably supplying the animals or hogs with food and whereby this may be effected for all the animals simultaneously, the lever 14 is grasped and suitably actuated, as will be readily understood, when the numerous bottom forming sections or members 5 will be suitably tilted, dumping their contents into said feeding trough compartments. These bottom-forming sections or members, after such tilting action and release of the lever 14, will automatically resume their initial or horizontal position under gravity action by reason of being eccentrically pivoted or hung in position above indicated.

From the foregoing description, taken in connection with the accompanying drawing or illustration, it is considered that the advantages and benefits of my invention have been fully and adequately disclosed, it however being further observed that it is characterized for its simplicity of construction, the facilities which it affords for feeding the animals, and expedition attending its manipulation or actuation, as has been fully made apparent.

What is claimed is:

1. A feeding device of the character described embracing a feed-containing receptacle, a chute having its upper end in communication with the lower end of said receptacle, a bottom forming arrangement of sections, each section including a plate-member having an upstanding or edgewise disposed portion along a longitudinal edge thereof, said plate-member also having depending lateral extensions, pivoting members for said sections extending eccentrically through said depending extensions, parallel members receiving between them bolts, said plate members having deflected inflexible arms fixed thereto at a longitudinal edge thereof, said bolts being connected to said arms at their lower ends and a lever connected to said parallel members.

2. A feeding device of the character described, including a feed-containing receptacle of hopper-like formation, having a lower tapered chute-like delivery portion, a bottom for said hopper adapted to partition off said hopper from said chute-like delivery portion, said bottom or partition being formed of a plurality of pivoted plates, each having an upstanding plate-member along a longitudinal edge thereof and depending end plate-members, said bottom-forming plates having each at its opposite longitudinal edge a depending inflexible arm, the pivots of said bottom-forming plates being arranged off-center, a manually actuated lever, and a longitudinal connecting member having pivotal connection with said depending arms, at their lower ends, and with said manually actuated lever intermediate its ends, said upstanding plate-members being adapted to guard against the material received upon one bottom-forming plate overflowing upon an adjacent bottom-forming plate.

3. A feeding device of the type described, including a feed-containing member of hopper-like formation having a lower end rectangular portion, a chute-like delivery member for said hopper-like member, a bottom for said hopper adapted to partition-off said hopper from said chute-like delivery member, said bottom being formed of a plurality of pivoted plates, each having an upstanding flange along a longitudinal edge thereof and depending end plate-members, said flange standing transversely to the lateral surfaces of said rectangular portion and said depending end plate-members being parallel with said lateral surfaces, said bottom-forming plates having each at its opposite longitudinal edge a depending inflexible arm, the pivots of said bottom-forming plates being arranged off-center, a manually actuated lever, and a longitudinal connecting member having pivotal connection with said depending arms, at their lower ends, and with said manually actuated lever at a point between its ends, said flanges assuming a position opposite the unflanged longitudinal edges of the bottom-forming plates.

In testimony that I claim the foregoing as my own, I have hereto affixed my signature in the presence of two witnesses.

JOHN H. THORNBURG.

Witnesses:
  JOHN R. KITTERMAN,
  V. KITTERMAN.

Copies of this patent may be obtained for five cents each, by addressing the "Commissioner of Patents, Washington, D. C."